United States Patent [19]
Sawamoto

[11] Patent Number: 5,626,769
[45] Date of Patent: May 6, 1997

[54] OZONE WATER TREATMENT METHOD AND APPARATUS

[75] Inventor: Isao Sawamoto, Kanagawa, Japan

[73] Assignee: Permelec Electrode Ltd., Kanagawa, Japan

[21] Appl. No.: 285,698

[22] Filed: Aug. 4, 1994

[30] Foreign Application Priority Data

Aug. 6, 1993 [JP] Japan .................... 5-215218

[51] Int. Cl.$^6$ .................................................. C02F 1/78
[52] U.S. Cl. .................... 210/760; 95/46; 95/54; 96/6
[58] Field of Search ............... 95/46, 54; 96/6; 210/760

[56] References Cited

FOREIGN PATENT DOCUMENTS

| 0360009 | 3/1990 | European Pat. Off. ........ 95/46 |
| 91105 | 4/1988 | Japan ............................... 95/46 |
| 159007 | 6/1989 | Japan ............................... 95/46 |
| 118802 | 5/1991 | Japan ............................... 95/46 |

*Primary Examiner*—Neil McCarthy
*Attorney, Agent, or Firm*—Sughrue, Mion, Zinn, Macpeak & Seas

[57] ABSTRACT

There are provided an ozone water treatment method by comprising the steps of injecting an ozone-containing gas into pure water to prepare ozone water, supplying the ozone water to use point(s) for treatment of materials to be treated, and circulating for reuse or discharging the ozone water after use, which comprises disposing a deozonizing apparatus, the inside of which is divided into an ozone water passing zone and a reduced pressure zone by a diaphragm, at the downstream side of the use point(s), supplying the ozone water after use to the ozone water passing zone of the deozonizing apparatus, and removing residual ozone and residual oxygen in the ozone water after use by contacting the water with the reduced pressure zone through the diaphragm and an apparatus utilized in the ozone treatment method.

5 Claims, 1 Drawing Sheet

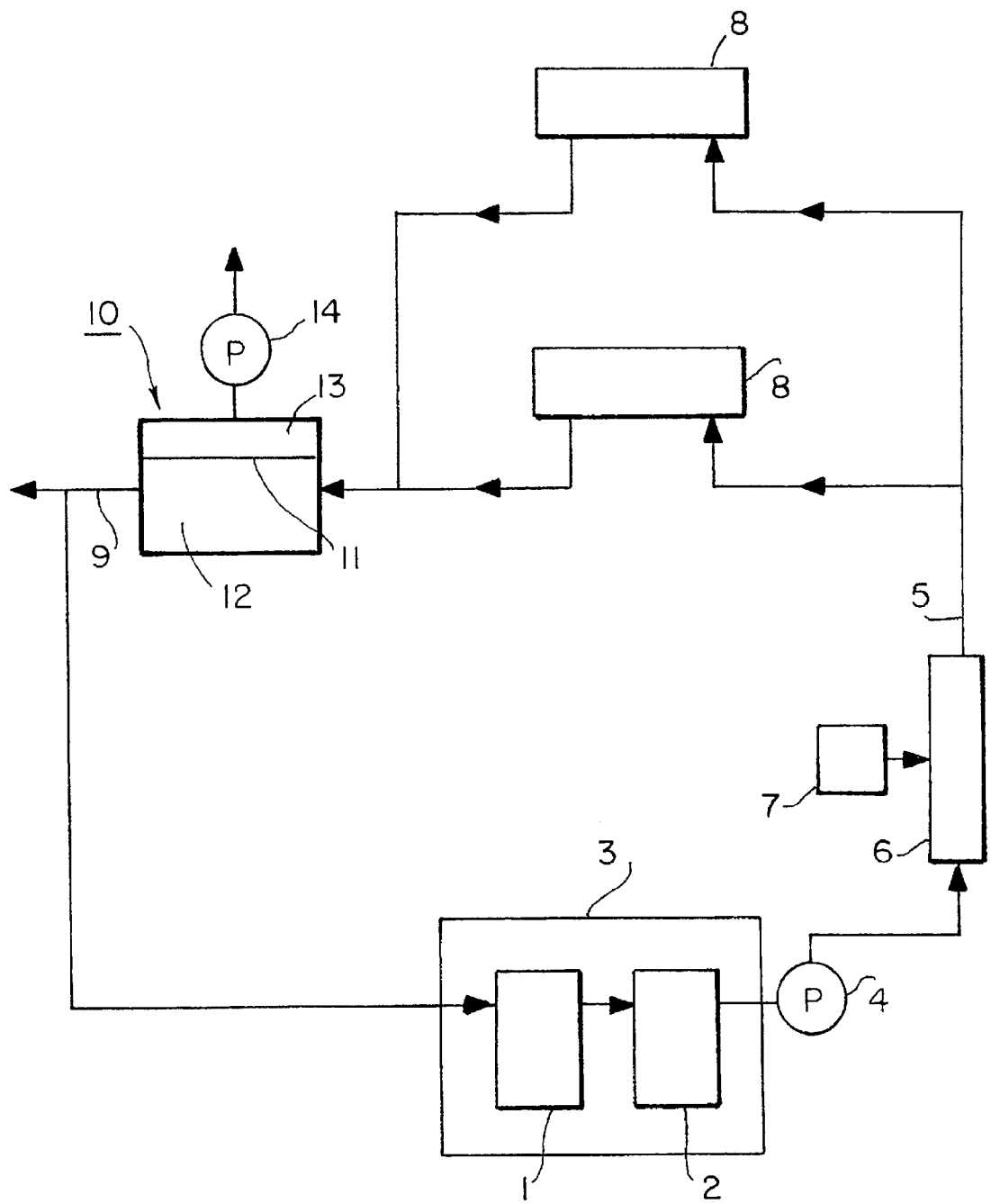

5,626,769

OZONE WATER TREATMENT METHOD AND APPARATUS

FIELD OF THE INVENTION

The present invention relates to an ozone water treatment method and apparatus and, more particularly to a method of efficiently removing ozone from ozone water utilized for a sterilization, washing, etc., in the technical fields of electron industries, medicament productions, etc., and to an apparatus utilized for the method.

BACKGROUND OF THE INVENTION

In the case of producing pure water used in the technical fields of washing parts in the electronic industry, the production of medicaments, etc., distilled water or pure water produced in a primary purification such as an ion exchange, etc., is used. Also used is water, the purity of which is improved by being supplied to a pure-water producing apparatus containing a polisher, etc. to further remove impurities such as particles, etc. Pure water thus produced is supplied to use point(s) through a supply line and, after it is used for washing, etc., any unused or used pure water is recycled to the foregoing primary purification step and reused.

Also, for improving the treatment efficiency of washing, etc., it has been attempted to dissolve ozone in pure water described above to form ozone-containing water and use the water for the treatment aforementioned such as washing parts, etc.

Since ozone has a stronger oxidizing power than chlorine, it has an effect for sterilization, deodorization, decolorization, etc., and is relatively easily decomposed into oxygen after the oxidizing action, whereby the problem of secondary pollution does not occur, the utilization of ozone is growing.

However, the decomposition of ozone in the above-described cases is insufficient, whereby a small amount of ozone remains, and oxygen, which is the decomposition product of ozone, is also dissolved in the water. For completely removing these remaining gases, at present, an active carbon treatment has been carried out, and the water thus treated is discharged in a river. In this case, if the water treated is circulated to the pure water circulating step described above, the treated water contains excessive impurities caused from the active carbon, and hence it is substantially impossible to use the treated water for the circulation step. Also, since the foregoing remaining gases have a bad influence on the pure-water producing apparatus, etc., it is inappropriate to circulate the water to the pure-water producing apparatus without applying a gas removal operation. For solving this problem, a method of using pipes composed of a material which is unsuitable for the growth of bacteria, and a method of carrying out the decomposition of ozone by a low-tension ultraviolet ozone decomposition apparatus directly before the foregoing pure-water producing apparatus (unexamined published Japanese patent application No. 2-144195), have been proposed. However, this method of carrying out ozone decomposition utilizing low-tension ultraviolet rays, has the disadvantage that the ozone in water is reluctant to decompose completely, and thus ozone is contained in the water being supplied to the pure-water producing apparatus, whereby the function of the pure-water producing apparatus becomes insufficient.

SUMMARY OF THE INVENTION

An object of the present invention is to solve the above-mentioned problems of the conventional techniques and provide an ozone water treatment method which almost completely removes ozone and oxygen remaining in pure water after using washing, etc., whereby the treated pure water can be discharged in a river or circulated for reuse.

Another object of the present invention is to provide an apparatus utilized in the ozone treatment method.

That is, according to an aspect of the present invention, there is provided an ozone water treatment method, which comprises disposing a deozonizing apparatus, the inside of which is divided into an ozone water passing zone and a reduced pressure zone by a diaphragm, at the downstream side of the used point(s) in the case of circulating ozone water for reuse or discharging after sending the ozone water to the use point(s), and using it for the treatment of subject materials to be treated, supplying the ozone water after use to the ozone water passing zone of the deozonizing apparatus and bringing the ozone water into contact with the reduced pressure zone through the diaphragm to remove residual ozone and residual oxygen in the water.

Another aspect of the present invention, is an ozone water treatment apparatus for practicing the ozone water treatment method described above.

BRIEF DESCRIPTION OF THE DRAWING

FIGURE is a flow sheet illustrating the ozone water treatment system of the present invention.

DETAILED DESCRIPTION OF THE INVENTION

The present invention is described in detail.

As described above, the utilization range of ozone is increasing and ozone is used in many fields, e.g., for water treatment such as water washing of liquid crystals, etc., medical fields, food fields, etc.

In the present invention, treatments, such as washing and sterilization of semiconductor substrates and liquid crystals, etc., are carried out by utilizing the sterilizing power of ozone. In the ozone water treatment system of the present invention, pure water having a resistance of about $18.25M\Omega$ is prepared by ordinary means, for example, distillation, an ion exchange, or a membrane treatment, whereby the pure water obtained scarcely contains metallic impurities (for example, $SiO_2$: 20 µg/l or less, Cu: 2 µg/l or less, and Zn: 5 µg/l or less). Thereafter, an ozone-containing gas which is a mixed gas of ozone and oxygen is usually injected and dissolved in the pure water to form ozone water (an oxygen gas is also dissolved therein). The ozone water is supplied to each use point through each supply line to carry out the treatment of liquid crystals, etc., by utilizing the sterilizing action of ozone.

Ozone remains in the used ozone water discharged from the use point. In the present invention, ozone (and oxygen) in the ozone water are removed by supplying the ozone water to the deozonizing apparatus. The deozonizing apparatus equipped with a diaphragm in the inside thereof to divide thereby the inside into an ozone water passing zone and a reduced pressure zone. While keeping the reduced pressure zone at a reduced pressure by a vacuum pump, etc., the ozone water is supplied to the ozone water passing zone. The ozone water supplied to the ozone water passing zone is brought into contact with the reduced pressure zone through the diaphragm. The ozone and oxygen remaining in the ozone water are sucked into the reduced pressure zone through the diaphragm and removed therein. Pure water containing substantially no ozone and oxygen (ozone: almost zero, and oxygen: 2000 µg/l or less), is thus formed, and removed from the deozonizing apparatus and discharged or circulated for reuse.

In the removal of residual ozone in this invention, impurities are reluctant to enter the treated water, which is different from conventional treatment using active carbon, and ozone water is converted into pure water containing no ozone and impurities.

The pure water treated by the method of this invention does not cause environmental problems even when the pure water is discharged because the content of impurities is almost zero, and also since the pure water does not contain ozone, which could harm a pure-water producing apparatus, the pure water can be circulated into the pure-water producing apparatus for reuse.

There is no particular restriction on the diaphragm used in the deozonizing apparatus and the diaphragm may be formed with, for example, PTFE (ethylene tetrafluoride resin) so-called Teflon, PFA (ethylene tetrafluoride-perfluoroalkoxyethylene copolymer resin), PVDF (vinylidene fluoride resin), FEP (ethylene tetrafluoride-propylene hexafluoride copolymer resin), ETFE (ethylene tetrafluoride-ethylene copolymer resin), etc., and the pore size of the diaphragm may be selected such that water does not substantially permeate through the diaphragm at the reduced pressure used, and is preferably from about 0.01 to 10 µm, and more preferably from 0.1 to 2 µm thick.

The reduced pressure in the reduced pressure zone may be selected such that substantially all ozone and oxygen dissolved in the ozone water can be sucked through the diaphragm and is preferably from 15 to 110 torr, and more preferably from 30 to 80 torr.

It is necessary that ozone being used in the present invention is highly-pure ozone hardly containing impurities (for example, Fe: 10 µg/Nm$^3$ or less, Cu: 2 µg/Nm$^3$ or less, and Zn: 5 µg/Nm$^3$ or less). The ozone can be produced by a silent discharging system, wherein a high voltage is applied to an oxygen gas to convert part of oxygen into ozone, but the ozone produced by the system contains a considerable amount of particles and metals, and hence such an ozone is not desirable for washing, in particular, in the electron industry.

In the present invention, it is desirable to use an oxygen-mixed ozone gas by an electrolysis system of obtaining ozone having higher purity than ozone obtained by the foregoing silent charging system, and the concentration of the ozone gas in the mixed gas is from about 14 to 20% by weight.

To obtain the oxygen-ozone mixed gas described above by electrolyzing water, a material obtained by coating a base material having an ozone resistance, such as a titanium base material with lead oxide or tin oxide as an anode in one side of a solid electrolyte is used, and a material obtained by coating a base material such as a stainless steel, carbon, etc., with a platinum group metal such as platinum, etc., as an anode in the other side of the solid electrolyte is used, respectively. Pure water is continuously or intermittently supplied to the anode, and a direct current voltage may be applied between the anode and the cathode.

An example of the ozone water treatment method of the present invention is explained based on the accompanied drawing.

FIGURE is a flow sheet showing an example of the ozone treatment method of the present invention.

As shown in FIGURE, pure water produced by a pure-water producing apparatus 3 including a distillation apparatus 1 and an ion-exchange means 2 is supplied to an ozone water producing apparatus 6 disposed at an intermediate portion of the supply line 5 by a circulating pump 4.

Into the pure water supplied to the apparatus 6 is injected an ozone-containing gas produced in a ozonizer 7 disposed adjacent thereto and the pure water is converted into ozone water. In the example shown by FIGURE, the ozone water is supplied to two use points 8,8 in parallel and in the use points 8,8, the treatment of subject materials, such as washing of electron parts, etc. is conducted. The ozone water containing ozone and oxygen used for the treatment, and the unused ozone water containing ozone and oxygen, are assembled and in the case of passing a return line 9, are supplied to a deozonizing apparatus 10 disposed at the line 9.

The inside of the deozonizing apparatus 10 is divided into an ozone water passing zone 12 and a reduced pressure zone 13 by a diaphragm 11, and a vacuum pump 14 is connected to the reduced zone 13 to keep the reduced pressure zone at a definite reduced pressure. Since the ozone water supplied to the ozone water passing zone 12 is in contact with the reduced pressure zone 13 through the diaphragm 11, ozone and oxygen dissolved in the ozone water are sucked to the side of the reduced pressure zone 13 and removed, thereby the ozone water is converted into pure water. The pure water from which ozone and oxygen have been removed is discharged from the system or is circulated to the pure-water producing apparatus 3.

The pure water circulated into the pure-water producing apparatus 3 contains almost no remaining ozone and does not harm the function of the pure-water producing apparatus. Also, since the pure water discharged from the system does not contain ozone and oxygen, it does not create harmful effects on environmental sanitation.

An example of the ozone water treatment method of the present invention is described, but the invention is not limited by the example.

EXAMPLE

According to the flow chart shown in FIGURE, a washing treatment of subject materials with ozone water was carried out.

By contacting original water having a specific resistance of $10^4$ Ω cm with anion and cation exchange resins in the pure-water producing apparatus to remove impurities, pure water having a specific resistance of 2MΩ cm was produced. The oxygen concentration in the pure water was 0.5 mg/liter. The pure water was supplied to an ozone water producing apparatus at a rate of 10 liters/minute and brought into contact with an ozone-containing gas at a ratio of 10 g-O$_3$/hour to provide ozone water. The ozone concentration of ozone of the ozone water was 10 mg/liter and also the concentration of dissolved oxygen was at least 9 mg/liter, which was in a supersaturated state.

The ozone water was supplied to the use points, and used for washing liquid crystals. When the ozone concentration of the ozone water after use was measured, the ozone concentration was reduced to 3 mg/liter, but the concentration of dissolved oxygen was at least 9 mg/liter, which was also in the supersaturated state.

The ozone-containing water was introduced into the ozone water passing zone of the deozonizing apparatus, the inside of which was divided into the ozone water passing zone and the reduced pressure zone by equipping a diaphragm composed of PTFE. When the ozone water treatment was carried out by keeping the reduced pressure of the reduced pressure zone at 30 torr by means of a vacuum pump, the ozone concentration of pure water removed from the deozonizing apparatus became zero and the concentration of dissolved oxygen was reduced to 0.5 ppm or less.

The present invention is an ozone water treating method that injects an ozone-containing gas in pure water to prepare ozone water, supplies the ozone water to use point(s) to use for the treatment of subjected materials to be treated, and circulates for reuse or discharges the ozone water after use, wherein a deozonizing apparatus is utilized, which is disposed at the downstream side of the usepoint(s) and the inside of which is divided into an ozone water passing zone and a reduced pressure zone by a diaphragm. The ozone water after use is supplied to the ozone water passing zone of the deozonizing apparatus and the ozone water is brought into contact with the reduced pressure zone through the diaphragm, whereby residual ozone and residual oxygen are removed. The present invention also concerns an apparatus used for the foregoing method.

In the present invention, residual ozone and oxygen contained in the ozone water after being used for washing liquid crystals, etc., are almost completely removed by contacting the ozone water with the reduced pressure zone through the diaphragm. Accordingly, even when the water thus treated is discharged from the system as it is, the water does not contaminate the environment. Also, when the water treated is circulated to the pure-water producing apparatus for reuse, the water does not deteriorate the performance of a pure-water producing apparatus having an inferior durability to ozone, since the water does not contain residual ozone and thus, the cycle of the pure water production, the ozone water production, the treatment of subjected materials with the ozone water can be continuously carried out without interrupting the operation.

Also, as the ozone-containing gas being used in the present invention, an anodic gas formed by an electrolysis of water can be used, and since the content of impurities in the anodic gas is very slight, the purities of the ozone water and the water being circulated after use are improved.

While the invention has been described in detailed with reference to specific embodiments, it will be apparent to one skilled in the art that various changes and modifications can be made to the invention without departing from its spirit and scope.

What is claimed is:

1. An ozone water treatment method comprising the steps of:

(A) injecting an ozone-containing gas into pure water to prepare ozone water, (B) supplying the ozone water to at least one use point for treatment of materials to be treated, (C) circulating for reuse or discharging the ozone water after use at a downstream side of the use point to a deozonizing apparatus, wherein the deozonizing apparatus has an inside which is divided into an ozone water passing zone and a reduced pressure zone by a diaphragm, (D) supplying the ozone water after use to the ozone water passing zone of the deozonizing apparatus, and (E) removing residual ozone and residual oxygen in the ozone water after use by contacting the water with the reduced pressure zone through the diaphragm;

wherein the diaphragm is formed from an ozone resistant fluorine resin selected from the group consisting of an ethylene tetra fluoride resin, an ethylene tetrafluoride-perfluoroalkoxyethylene copolymer resin, a vinylidene fluoride resin, an ethylene tetrafluoride-propylene hexafluoride copolymer resin, and an ethylene tetrafluoride-ethylene copolymer resin.

2. The ozone water treatment method of claim 1, wherein the diaphragm is 0.01 to 10 μm thick.

3. The ozone water treatment method of claim 1, wherein the diaphragm is 0.1 to 2 μm thick.

4. The ozone water treatment method of claim 1, wherein the reduced pressure zone has a pressure of 15 to 110 torr.

5. The ozone water treatment method of claim 1, wherein the reduced pressure zone has a pressure of 30 to 80 torr.

* * * * *